(No Model.) 2 Sheets—Sheet 1.

E. LANDES.
CULTIVATOR.

No. 399,757. Patented Mar. 19, 1889.

WITNESSES:
Chas. O. Nida
C. Sedgwick

INVENTOR:
E. Landes
BY Munn & Co.
ATTORNEYS.

(No Model.) 2 Sheets—Sheet 2.

E. LANDES.
CULTIVATOR.

No. 399,757. Patented Mar. 19, 1889.

WITNESSES:
Chas. Nida
C. Sedgwick

INVENTOR:
E. Landes
BY Munn & Co.
ATTORNEYS.

UNITED STATES PATENT OFFICE.

ENOS LANDES, OF RESERVE, KANSAS.

CULTIVATOR.

SPECIFICATION forming part of Letters Patent No. 399,757, dated March 19, 1889.

Application filed September 29, 1888. Serial No. 286,774. (No model.)

*To all whom it may concern:*

Be it known that I, ENOS LANDES, of Reserve, in the county of Brown and State of Kansas, have invented a new and useful Improvement in Cultivators, of which the following is a full, clear, and exact description.

My invention relates to an improvement in cultivators, and has for its object to provide an implement specially adapted for cultivating young corn, which may be used alone or in connection with a riding-frame; and the further object of the invention is to provide an implement in which the plant cultivated will be protected by an adjustable shield, and, further, wherein the ground will be broken by cultivator-blades at each side of the rows and, the weeds cleared away near the plants; and another object of the invention is to provide a means whereby the blades and hoes will be adjustable.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
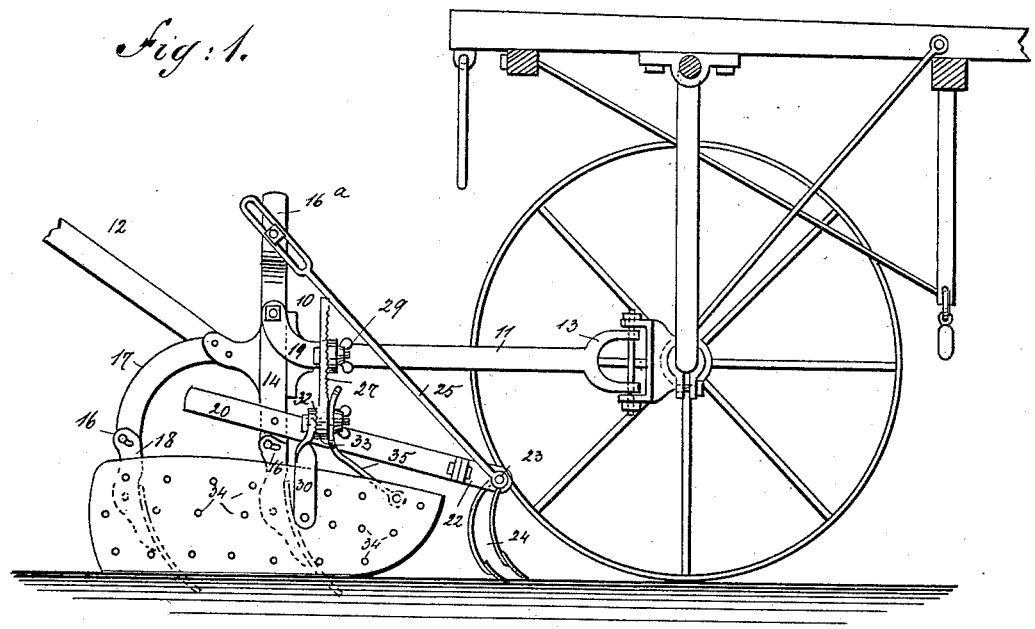
Figure 2:
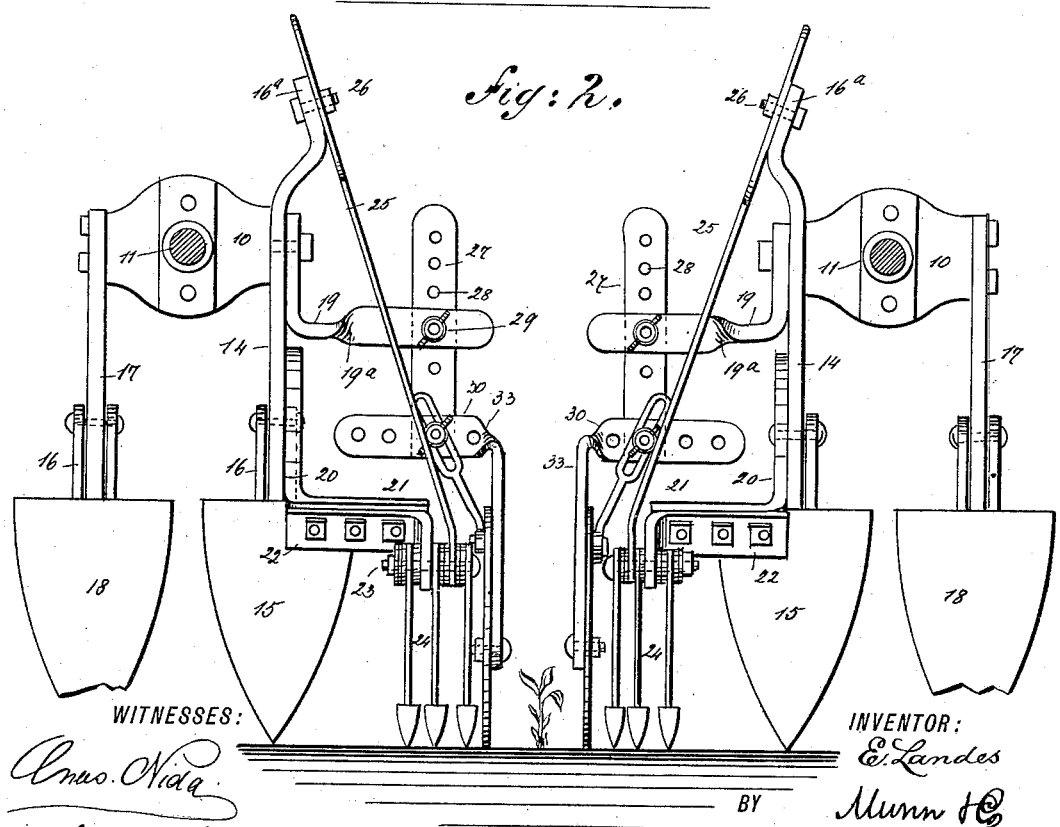
Figure 3:
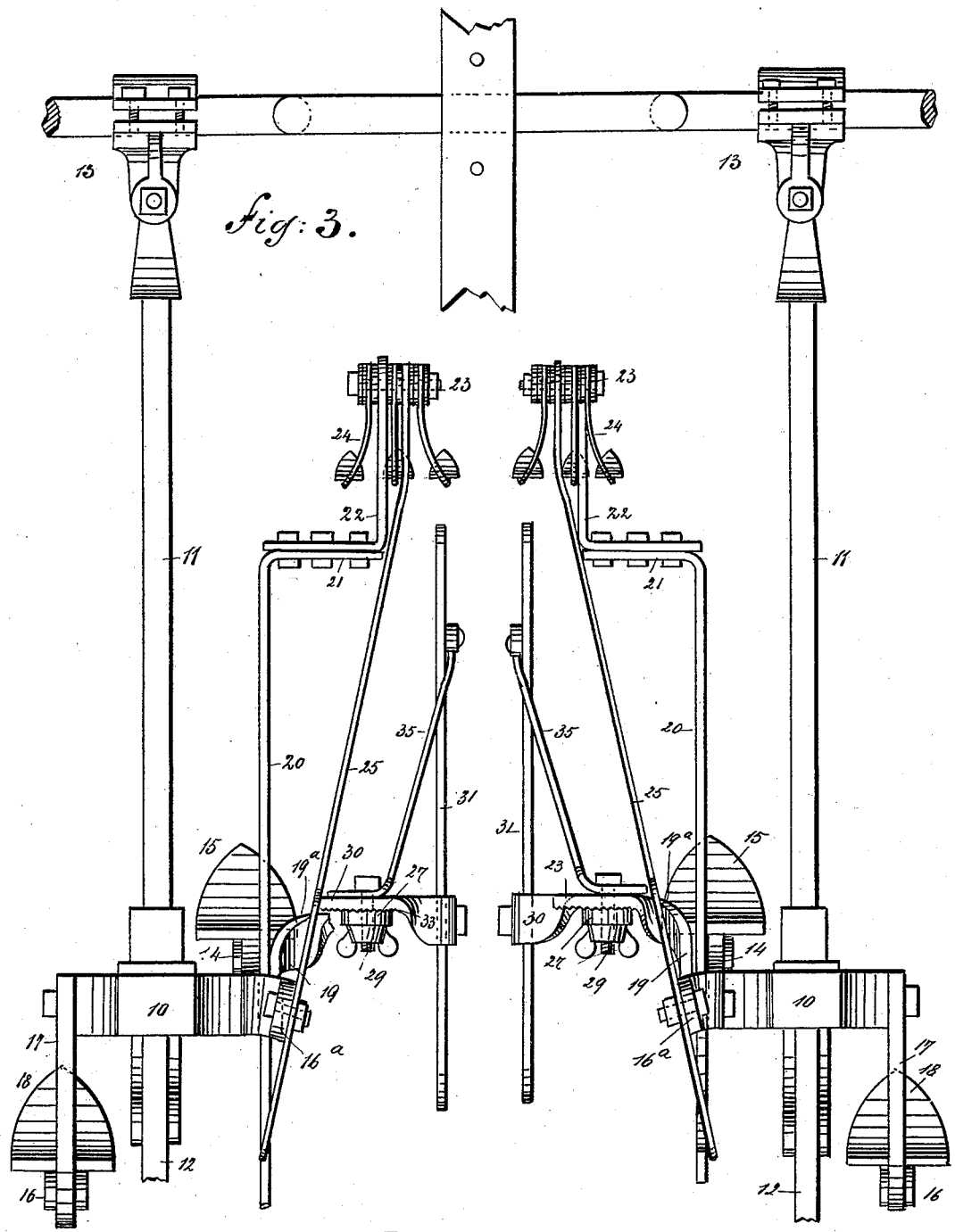

Figure 1 is a side elevation of the cultivator used as a riding-cultivator. Fig. 2 is an end view, the shafts being in section; and Fig. 3 is a plan view.

In carrying out the invention the frame proper of the cultivator consists of a block, 10, centrally from which the shaft 11 is projected, and from the rear a handle, 12. The shaft 11 is provided at the extremity with a clip, 13.

From the inner end of the block 10 an arm, 14, is downwardly and essentially perpendicularly extended, provided at the lower extremity with a cultivator-blade, 15, adjustably attached thereto, the attachment being effected through the medium of a yoke-like shank, 16, integral with the blade embracing the arm 14, and a bolt passing through said arm and shank. The upper end of the arm 14 is carried above the block 10 and curved outward in direction of the sides of the implement, as indicated at $16^a$.

From the outer end of the block 10 a downwardly and rearwardly curved arm, 17, is projected, having a cultivator-blade, 18, detachably secured thereto in a similar manner to the blade 15, as best shown in Figs. 1 and 2.

To the inner face of the blade-carrying arm 14, at or near the block 10, a bar, 19, is secured, extending at a right angle inward, the horizontal member whereof is given a quarter-turn, as best shown at $19^a$ in Fig. 2. Below the twisted bar 19 a second angled bar, 20, is secured, and to the outer face of the member or extension 21 of said bar 20, which projects inward, another angled bar, 22, is attached capable of lateral adjustment.

The forward angle-bar, 22, is provided with an eye in the extremity, through which eye a bolt, 23, is passed, adapted to carry two or more forwardly-curved hoes, 24, according to the nature of the ground. The hoes are held in position by a nut screwed upon the bolt 23, or equivalent means, and a washer or washers are made to intervene the heads of said hoes.

The vertical adjustment of the hoes 24 is effected by a rod, 25, secured at one end to the bolt 23, and having a slotted opposite end, which bar is carried rearward and upward to a contact with the inclined face of the extension $16^a$, forming a part of an ear secured to the upper of the blade arm or standard 14, and the said adjusting-bar is retained in position by a bolt, 26, passing through said extension and the slotted end of the rod, as best shown in Figs. 2 and 3.

To the horizontal member of the twisted bar 19 a perpendicular standard, 27, is secured, said standard containing a number of apertures, 28. The forward face of the said horizontal member of the bar 19 is preferably transversely serrated to within a short distance of the lower end, and the contiguous face of the standard is likewise serrated, as best shown in Fig. 1. The adjustable connection is effected by the engagement of the two serrated surfaces and a bolt, 29, provided with a wing-nut, passing through an aperture in the twisted angled bar 19 and one of the apertures 28 in the standard.

A lower angle-bar, 30, adapted to support a shield, 31, is adjustably secured to the lower end of the standard 27, the rear face at the said end being toothed or serrated to form a clutch-section, as shown at 32 in Fig. 1, and the forward face of the horizontal member is also serrated to engage with the clutch-section, the two being held in a fixed position by a bolt and suitable nut. At the angle of the bar 30 the same is provided with a twist, 33, whereby the upper member of the said bar 30 may rest flat against the standard 27, and the lower end in like manner bear upon the inner face of the shield 31, which is perpendicular. The bar 30 is attached to the shield by means of a rivet or bolt passing through one of a series of apertures, 34, in the said shield, arranged longitudinally in rows. The shield is adapted to travel upon the ground longitudinally of the implement between the rows to be cultivated.

By means of the aforesaid arrangement it will be observed that the shield may be given any vertical inclination, and the said shield is adjustably braced by a rod, 35, attached thereto at one end, being slotted at the opposite end and preferably engaged by the bolt securing the perpendicular standard 27 to the twisted shield-bar 31.

In operation two such cultivators as described are employed, one being adapted to travel at each side of the row, the shafts or tongues being united to a transverse pole, to which the whiffletrees are attached, or directly to the axles of a pair of wheels or equivalent riding apparatus.

Having thus described my invention, what I claim as new, and desire to secure by Letters Patent, is—

1. The combination, with a body-block, 10, a shaft, 11, attached to the same, a perpendicular arm, 14, and rearwardly-curved arm 17, attached, respectively, to opposite ends of said block, and cultivator-blades 15 and 18, adjustably secured to said arms, respectively, of an angled bar, 20, adjustably attached to one of said arms, a second short angle-bar, 22, adjustably attached to aforesaid bar, and adjustable hoes 24, carried by the combined angle-bars, substantially as shown and described.

2. The combination, with a body-block, 10, a shaft, 11, attached to the same, a perpendicular arm, 14, and a rearwardly-curved arm, 17, secured, respectively, to opposite ends of the block, and cultivator-blades 15 and 18, adjustable upon said arms, of an angled bar, 20, adjustably attached to one of said arms, a second angled bar, 22, laterally adjustable upon the aforesaid bar, detachable hoes 24, carried by the combined angled bars, and an adjustable brace-bar, 25, secured, respectively, to the upper end of the inner blade-carrying arm and combined angled bars, substantially as shown and described.

3. The combination, with a body-block, 10, a shaft, 11, attached to the same, a perpendicular arm, 14, and a rearwardly-curved arm, 17, secured, respectively, to opposite ends of the block, and cultivator-blades 15 and 18, adjustable upon said arms, of an angled bar, 20, adjustably secured to one of said arms, a second angled bar, 22, laterally adjustable upon the aforesaid bar, detachable hoes 24, carried by the combined angled bars, an adjustable brace-bar, 25, secured, respectively, to the inner blade-carrying arm, 14, and the combined and angled bars, and a laterally and vertically adjustable shield, 31, supported from the said inner blade-carrying arm at a short distance therefrom, substantially as shown and described.

ENOS LANDES.

Witnesses:
 ANDREW J. WEYER,
 JOSEPH W. DENDURENT.